C. J. FEIKER.
HEADLIGHT.
APPLICATION FILED MAY 21, 1909.
964,413.
Patented July 12, 1910.
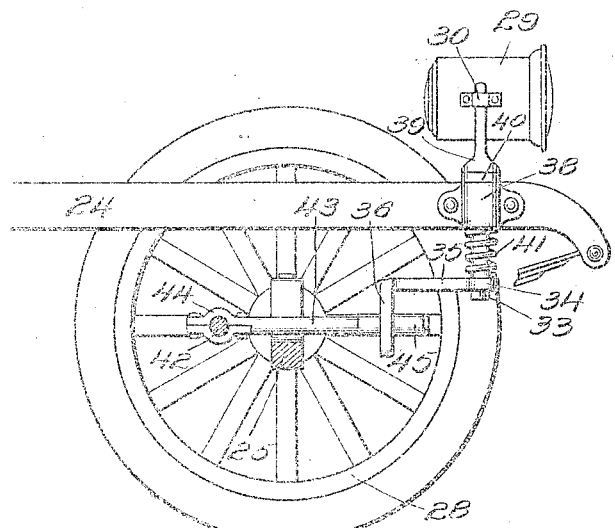
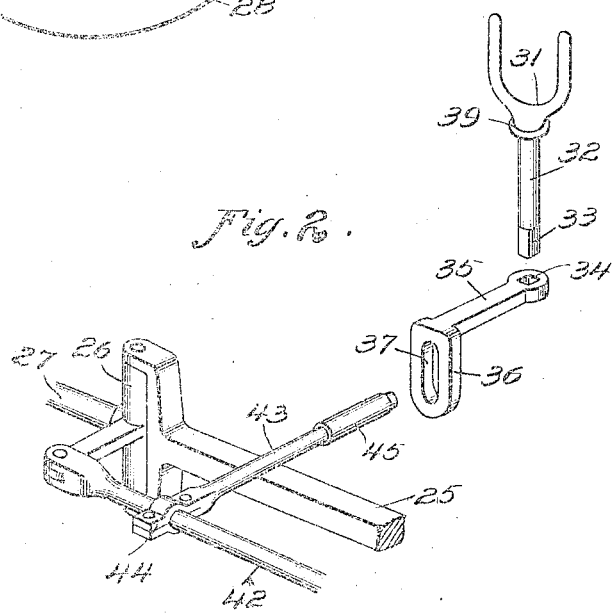

UNITED STATES PATENT OFFICE.

CHARLES JOSEPH FEIKER, OF RACINE, WISCONSIN.

HEADLIGHT.

964,413.

Specification of Letters Patent. Patented July 12, 1910.

Application filed May 21, 1909. Serial No. 497,472.

*To all whom it may concern:*

Be it known that I, CHARLES JOSEPH FEIKER, a citizen of the United States, residing at Racine, in the county of Racine and State of Wisconsin, have invented new and useful Improvements in Headlights, of which the following is a specification.

This invention relates to headlights for railway and street cars, automobiles and other like vehicles, and its object is to provide an improved construction of headlight which will turn with the front wheels of the vehicle and direct the rays of light upon the track or in the direction of movement of the front wheels, whether the car is moving in a straight line or rounding a curve.

The invention consists of the features of construction, combination and arrangement of parts hereinafter fully described and claimed, reference being had to the accompanying drawings, in which:—

Figure 1 is a side elevation of the front portion of an automobile frame, showing the application of the invention to a vehicle of this type. Fig. 2 is a perspective view of the front axle of the vehicle and the coacting parts of the headlight controlling mechanism.

Referring to the drawing, 24 designates the forward portion of the frame or chassis of an automobile, and 25 the front or steering axle thereof, which latter is provided at each end with a pivoted knuckle 26 having a spindle 27 extending therefrom and on which the associated front steering wheel 28 is mounted. The headlight 29, which may be of the type commonly employed upon vehicles of this character, is provided at each side with a loop 30 to allow it to be slipped down between and upon the arms of a forked bracket 31 mounted upon the upper end of a rock shaft 32, having an angular lower end 33. The said angular lower end 33 fits within an angular socket 34 upon the forward end of a crank arm 35, which latter is provided with a depending portion or link plate 36 having an elongated vertical slot 37.

The shaft 32 is journaled in a bearing 38 on the frame 24 and is provided at its juncture with the base of the bracket 31 with a shoulder 39, between which and the upper surface of the frame portion 24 is arranged a washer 40 forming an anti-rattling support at this point. The lower end of the shaft projects below the frame and is inclosed by a coiled cushioning spring 41 disposed between the same and the bottom of the bearing 38 and operating in conjunction with the washer to permit the shaft to have a sufficient amount of yielding motion to absorb vibration and prevent rattling of the parts.

The knuckles 26 of the two front steering wheels of the vehicle are pivotally connected in the customary manner by a rod 42, and to this rod is connected the rear end of a crank arm or rod 43, having a bifurcated or clip portion 44 at its rear end engaging said rod 42 and carrying at its forward end an anti-friction sleeve or roller 45 which fits within the slot 37 of the link plate 36 of the connecting or crank arm 35.

From the foregoing description, it will be seen that the shaft 32 is mounted upon the frame for movement in either direction laterally of the vehicle, and that the rod or crank arm 43 is shiftable laterally by the rod 42 when the latter is moved in one direction or the other to turn the steering wheels 28. As the rod 43 is swung in one direction or the other, its forward end turns the crank arm 35 and thus oscillates the shaft 32 to turn the headlight 29 in the same direction as the wheels. The slot 37 permits the forward end of the arm 43 to have independent vertical play therein to compensate for the cushioning action of the wheels and springs of the running gear without throwing strain upon the other parts of the headlight. It will be apparent that the headlight 29 will be turned as the wheels are turned to direct the rays of light therefrom in the direction of motion of said wheels at all times in the running of the vehicle.

Having thus fully described the invention, what is claimed as new, is:—

1. In a lamp for vehicles, the combination with a frame, an axle, steering wheels pivoted to the axle, and a transverse rod pivotally connecting said wheels, of a bearing upon the frame, a vertical rock shaft journaled in said bearing, a lamp mounted upon the upper end of said shaft, a crank arm on the lower end of the shaft provided with a downturned slotted link, a cushioning spring surrounding the shaft between the bearing and crank arm, and an operating rod coupled at one end to said connecting rod and provided at its free end with a friction roller engaging said slotted link.

2. In a lamp for vehicles, the combination with a frame, an axle, steering wheels pivoted to the axle, and a transverse rod pivotally connecting said wheels, of a bearing upon the frame, a vertical rock shaft having a shoulder resting thereon, said shaft being provided with an upwardly extending lamp support and an angular lower end, a lamp mounted upon said support, a crank arm engaging the angular end of the shaft and extending rearwardly therefrom and provided with a downturned link having a longitudinal slot therein, a cushioning spring surrounding the shaft between the bearing and the crank arm, an operating rod coupled at one end to said connecting rod, and a friction roller at the free end of said operating rod engaging the slot in the link.

In testimony whereof I affix my signature in presence of two witnesses.

CHARLES JOSEPH FEIKER.

Witnesses:
GEORGE W. MORRIS,
S. E. CRAIG.